United States Patent
Cho et al.

(10) Patent No.: US 9,915,774 B2
(45) Date of Patent: Mar. 13, 2018

(54) INDICATOR AND ELECTRONIC DEVICE INCLUDING THE SAME

(71) Applicant: Samsung Electronics Co., Ltd., Gyeonggi-do (KR)

(72) Inventors: Sunkeun Cho, Gyeonggi-do (KR); Jaewoo Lee, Seoul (KR); Hyoksoo Kwon, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 59 days.

(21) Appl. No.: 15/001,124

(22) Filed: Jan. 19, 2016

(65) Prior Publication Data

US 2016/0209569 A1    Jul. 21, 2016

(30) Foreign Application Priority Data

Jan. 19, 2015 (KR) ......................... 10-2015-0008658

(51) Int. Cl.
*G01K 1/06* (2006.01)
*F21V 8/00* (2006.01)

(52) U.S. Cl.
CPC ........... *G02B 6/006* (2013.01); *G02B 6/0051* (2013.01); *G02B 6/0063* (2013.01); *G02B 6/0076* (2013.01)

(58) Field of Classification Search
CPC ....... G01D 11/28; G02B 6/006; G02B 6/0053
USPC ................................ 362/23.01, 23.03, 23.12
See application file for complete search history.

(56) References Cited

U.S. PATENT DOCUMENTS

| 7,165,873 | B2 * | 1/2007 | Parker ................... | A61M 21/02 |
| | | | | 362/23.1 |
| 8,506,101 | B2 * | 8/2013 | Mathers ................. | H01H 9/182 |
| | | | | 200/311 |
| 2002/0111195 | A1 | 8/2002 | Kweon et al. | |
| 2014/0218889 | A1 | 8/2014 | Kwak | |
| 2015/0098249 | A1 * | 4/2015 | Song ...................... | G02B 6/002 |
| | | | | 362/612 |

FOREIGN PATENT DOCUMENTS

JP    2002-287144 A    10/2002

* cited by examiner

*Primary Examiner* — Ahshik Kim

(57) ABSTRACT

Disclosed is an indicator including: light guide members; light emitting elements arranged around the light guide members; and diffusion sheets laminated on one or more surfaces of the light guide members and configured such that light irradiated from the light emitting elements is uniformly spread out to upper and lower surfaces of the light guide members after being guided to the light guide members, and an electronic device including the same. The light diffused by the diffusion sheets is simultaneously emitted on two or more different surfaces outside of an electronic device. Because the electronic device can improve convenience of use of the electronic device by allowing the user to easily recognize information output from the electronic device regardless of the positioning state of the electronic device because the indicator is arranged such that information may be output on at least two surfaces at the same time.

15 Claims, 10 Drawing Sheets

INDICATOR AND ELECTRONIC DEVICE INCLUDING THE SAME

CROSS-REFERENCE TO RELATED APPLICATION AND CLAIM OF PRIORITY

The present application is related to and claims benefit under 35 U.S.C. § 119(a) to Korean Application Serial No. 10-2015-0008658, which was filed in the Korean Intellectual Property Office on Jan. 19, 2015, the entire content of which is hereby incorporated by reference.

TECHNICAL FIELD

The present disclosure relates to an indicator and an electronic device including the same.

BACKGROUND

Electronic devices are important means for transmitting various kinds of information to the users. The information may be displayed through a display of an external device functionally connected to an electronic device. As the kinds of external electronic devices that are functionally connected to an electronic device to display information have been diversified, the electronic device may provide information for the user in various forms, and accordingly convenience for the user can be improved. The electronic device may include various input means (for example, a touch or a gesture) for receiving a user input related to information.

The electronic device may include a display for outputting information. The display may be available when the electronic device is activated. Even in an inactivated state of the electronic device, the display may be available when it is positioned at an easily recognizable location.

The electronic device may also include an indicator that may transmit at least a part of state information of the electronic device to the user even when the display is not activated. In recent years, the indicators have been improved to transmit information to the users more efficiently.

SUMMARY

The indicator according to the related art may be arranged only on one surface of the electronic device. Accordingly, when the electronic device is positioned on a desk or the like, the user may be easily informed of desired information (for example, reception of a message or identification of a battery state) if the corresponding surface of the electronic device faces upwards, but the user cannot be informed of the information received by the electronic device if the corresponding surface of the electronic device faces downwards.

Furthermore, the state information of the electronic device including a foldable dual display may be easily recognized because the indicator is arranged at a location that may be identified by naked eyes while the cover is opened, but it is impossible to recognize information through the indicator because the indicator is hidden in a closed state of the cover.

To address the above-discussed deficiencies, it is a primary object to provide an indicator that allows the user to recognize state information of an electronic device in various directions, and an electronic device including the same.

The present disclosure also provides an indicator that allows information to be output on two or more surfaces of an electronic device, and an electronic device including the same.

In accordance with an aspect of the present disclosure, there is provided an indicator including: one or more light guide members; one or more light emitting elements arranged around the light guide members; and diffusion sheets laminated on one or more surfaces of the light guide members and configured such that light irradiated from the light emitting elements is uniformly spread out to upper and lower surfaces of the light guide members after being guided to the light guide members, wherein the light diffused by the diffusion sheets is simultaneously emitted to the outside on two or more different surfaces of an electronic device.

In accordance with another aspect of the present disclosure, there is provided an indicator including: an ornamental member formed of a light reflecting material; one or more light guide members arranged in one or more areas of upper and lower surfaces of the ornamental member to overlap each other; one or more light emitting elements arranged around the light guide members; and diffusion sheets laminated on one or more surfaces of the light guide members and configured such that light irradiated from the light emitting elements is uniformly spread out to upper and lower surfaces of the light guide members after being guided to the light guide members, wherein the light diffused by the diffusion sheets is simultaneously emitted to the outside on two or more different surfaces of an electronic device after being reflected by the ornamental member.

In accordance with another aspect of the present disclosure, there is provided an indicator including: a pair of light guide members; one or more light emitting elements arranged around the light guide members; diffusion sheets laminated on the pair of the light guide members and configured such that light irradiated from the light emitting elements is uniformly spread out to surfaces of the light guide members after being guided to the light guide members; and light transmitting members laminated on outer surfaces of the pair of light guide members, wherein the light uniformly spread by the diffusion sheets transmits the light transmitting members, and is emitted on two or more different surfaces outside of an electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
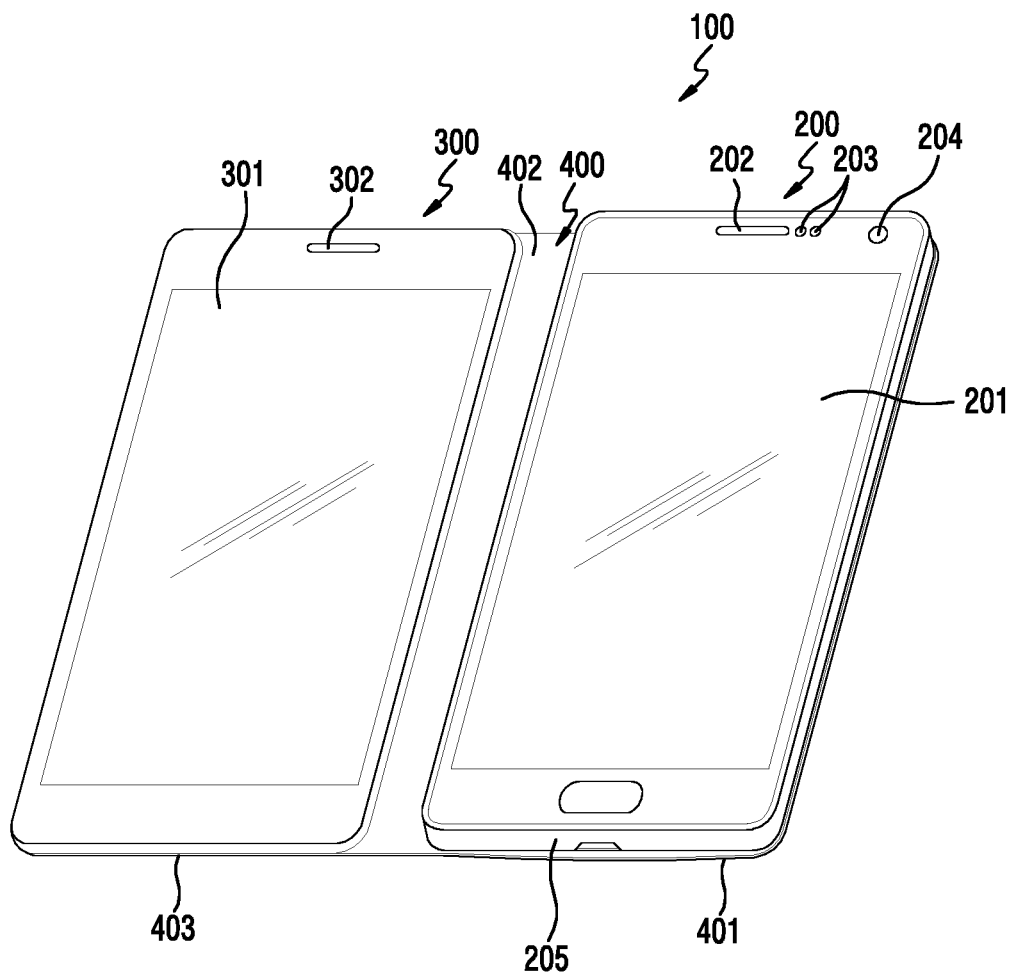
FIG. 1 illustrates an opened state of an electronic device including a dual display according to various embodiments of the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. Hereinafter, various embodiments of the present disclosure will be described in conjunction with the accompanying drawings. The present disclosure may be modified in various forms and include various embodiments, but specific examples are illustrated in the drawings and described in the description. However, the description is not intended to limit the present disclosure to the specific embodiments, and it shall be appreciated that all the changes, equivalents and substitutions belonging to the idea and technical scope of the present disclosure are included in the present disclosure. In the description of the drawings, identical or similar reference numerals are used to designate identical or similar elements.

The term "include" or "may include" refers to the existence of a corresponding disclosed function, operation or component which can be used in various embodiments of the present disclosure and does not limit one or more additional functions, operations, or components. In the present disclosure, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

The expressions such as "first", "second", or the like used in various embodiments of the present disclosure may modify various component elements in the various embodiments but may not limit corresponding component elements. For example, the above expressions do not limit the sequence and/or importance of the elements. The expressions may be used to distinguish a component element from another component element. For example, a first user device and a second user device indicate different user devices although both of them are user devices. For example, a first element may be termed a second element, and similarly, a second element may be termed a first element without departing from the scope of the present disclosure.

When it is described that a certain structural element "is connected to" or "is in contact with" another structural element, it should be understood that although the certain structural element is directly connected to or is in direct contact with another structural element, still another structural element may be interposed therebetween. Conversely, when one component element is "directly coupled" or "directly connected" to another component element, it may be construed that a third component element does not exist between the first component element and the second component element.

The terms in various embodiments of the present disclosure are used to describe a specific embodiment, and are not intended to limit the present disclosure. A singular expression may include a plural expression unless they are definitely different in a context.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to various embodiments of the present disclosure, which is electrically connected to a cable connector device, may be a device having a communication function. For example, the electronic device may include at least one of a smart phone, a tablet Personal Computer (PC), a mobile phone, a video phone, an e-book reader, a desktop PC, a laptop PC, a netbook computer, a PDA, a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and a smart watch.

According to some embodiments, the electronic device may be a smart home appliance with a communication function. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., HOMESYNC™ of SAMSUNG, APPLE TV™, or GOOGLE TV™), game consoles, electronic dictionaries, electronic keys, camcorders, or electronic frames.

According to some embodiments, the electronic device may include at least one of various medical devices such as a magnetic resonance angiography (MRA) scanner, a magnetic resonance imaging (MRI) scanner, a computed tomography (CT) scanner, a scanner, an ultrasonograph, or the like, a navigation device, a Global Positioning System (GPS) receiver, an Event Data Recoder (EDR), a Flight Data Recoder (FDR), a vehicle infotainment device, an electronic equipment for ship (for example a ship navigation device and gyro-compass and the like, avionics, a security device, a head unit for vehicle, an industrial or household robot, ATM (automatic teller machine) in banking facilities or POS (point of sales) in stores.

According to some embodiments, the electronic device may include at least one of furniture or a part of a building/structure, an electronic board, an electronic signature receiving device, a projector, and various types of measuring devices (for example, a water meter, an electric meter, a gas meter, a radio wave meter and the like) including a camera function. An electronic device according to various embodiments of the present disclosure may be a combination of one or more of above described various devices. Also, an electronic device according to various embodiments of the present disclosure may be a flexible device. Also, an electronic device according to various embodiments of the present disclosure is not limited to the above described devices.

Hereinafter, an indicator included in an electronic device according to various embodiments of the present disclosure will be described with reference to the accompanying drawings.

FIG. 1 is a perspective view illustrating an opened state of an electronic device 100 including a dual display 201 and 301 according to various embodiments of the present disclosure;

Referring to FIG. 1, the electronic device 100 may include two electronic devices 200 and 300 that include two displays 201 and 301, respectively. According to one embodiment, the electronic device 100 may be implemented in a foldable manner, and when the electronic device 100 is not used, the two displays 201 and 301 may be folded in an overlapping manner.

According to various embodiments, when the electronic device 100 is opened, a first electronic device 200 and a second electronic device 300 may be arranged in parallel to each other. According to one embodiment, the first electronic device 200 and the second electronic device 300 may be connected to each other by a protection cover 400 while not being separated from each other. According to one embodiment, the first electronic device 200 may be fixed to a first cover 401 and the second electronic device 300 may be fixed to a second cover 403. According to one embodiment, the first cover 401 and the second cover 403 may be connected to each other by a flexible connector 402. According to one embodiment, the first cover 401 may contribute as a battery cover arranged on a rear surface of the first electronic device 200. In this case, the first electronic device 200 may be electrically connected to the second electronic device 300 through the connector 402 and the second cover 403 by a flexible printed circuit (FPC) (not illustrated). According to one embodiment, the first cover 401 may contribute as a separate constituent element from the first electronic device 200.

According to various embodiments, the first electronic device 200 and the second electronic device 300 may perform wireless data communication without using a separate physical connection member. In this case, power supply units may be provided in the first electronic device 200 and the second electronic device 300, respectively. However, the present disclosure is not limited thereto, and a power supply unit may be included in any one of the two electronic devices 200 and 300, and the remaining one of the two electronic devices 200 and 300 may be operated by the power supply unit. In this case, the connector 402 may include an electrical connection unit (for example, an FPCB or a session cable) for electrically connecting the first electronic device 200 and the second electronic device 300.

According to one embodiment, when the second electronic device 300 is opened from the first electronic device 200, the first electronic device 200 may wirelessly communicate with the second electronic device 300, and in this case, information input to the first electronic device 200 may be output from the second electronic device 300. According to one embodiment, information input to the second electronic device 300 may be output from the first electronic device 200. According to one embodiment, information input to at least one of the first electronic device 200 and the second electronic device 300 may be simultaneously output from the two electronic devices 200 and 300. According to one embodiment, the first electronic device 200 and the second electronic device 300 may functionally interwork with each other through near field wireless communication (for example, BLUETOOTH, ZIGBEE, Wi-Fi, or Direct Mode Communication). However, the present disclosure is not limited thereto, and the connector 402 may include an electrical connection unit (for example, an FPCB or a session cable) for electrically connecting the first electronic device 200 and the second electronic device 300. The first electronic device 200 and the second electronic device 300 may communicate with each other through an electrical connection unit.

According to various embodiments, a first display 201 may be arranged on a front surface of the first electronic device 200 fixed to the first cover 401 of the protection cover 400. A speaker unit 202 for receiving voice of a counterpart may be installed above the display 201. A microphone unit 205 for transmitting voice of the user of the electronic device to a counterpart may be installed below the display 201.

According to one embodiment, the electronic device 200 may be arranged around the speaker unit 202 and may include components for performing various functions of the electronic device 200. The components may include one or more sensor modules 203. The sensor module 203 may include at least one, for example, of an illumination intensity sensor (for example, a light sensor), a proximity sensor, an infrared ray sensor, and an ultrasonic wave sensor. According to one embodiment, the components may include a camera unit 204.

According to various embodiments, a first display 301 may be arranged on a front surface of the second electronic device 300 fixed to the second cover 403 of the protection cover 400. According to one embodiment, the second display 301 may functionally interwork with the first display 201 through a wired or wireless connection. According to one embodiment, an inner opening 302 may be arranged above the second display 301. According to one embodiment, the inner opening 302 may be arranged at a location corresponding to the speaker unit 202 of the first electronic device 200 when the electronic device 100 is closed. According to one embodiment, the inner opening 302 may be arranged in a manner in which it communicates with an outer opening of the second cover 403 illustrated in FIG. 2.

According to various embodiments, an indicator 320 (see FIG. 3) may be installed in the interior of the second electronic device 300 corresponding to the inner opening 302. As will be described below in detail, when the electronic device 100 is opened, the indicator 320 transmits light irradiated by a light emitting element to emit light with an illumination through the inner opening such that information of the electronic device may be recognized by the user. According to one embodiment, the illumination may emit light with various colors according to the type of the information output from the electronic device 100.

Figure 2:
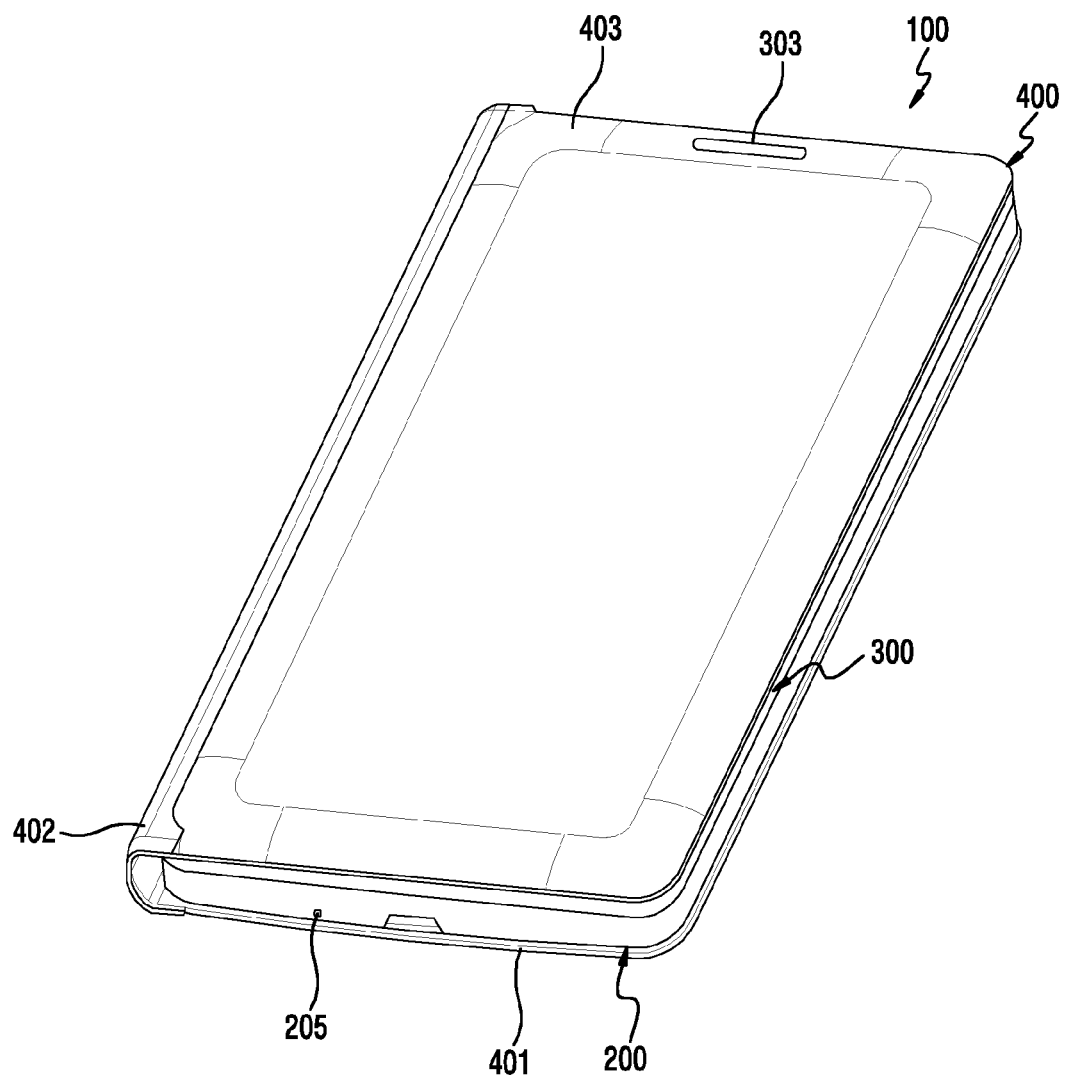
FIG. 2 illustrates a closed state of an electronic device including a dual display according to various embodiments of the present disclosure.

FIG. 2 is a perspective view illustrating a closed state of an electronic device 100 including a dual display according to various embodiments of the present disclosure.

FIG. 2 illustrates a closed state of the protection cover 400, and the electronic device 100 is configured such that the first electronic device 200 and the second electronic device 300 overlap each other such that the first display 201 and the second display 301 maintain an overlapped state. In this case, an outer opening 303 may be arranged on an outer surface of the second cover 403, and the outer opening 303 communicates with the inner opening 302 of the second cover 403 and may be arranged at a location corresponding to the speaker unit 202 of the first electronic device 200.

According to one embodiment, an indicator 320 (see FIG. 3) may be installed in the interior of the second electronic device 300 corresponding to the inner opening 302. When the electronic device 100 is closed, the indicator 320 transmits light irradiated by a light emitting element to emit the light with an illumination through the outer opening 303 such that information of the electronic device may be recognized by the user. According to one embodiment, the illumination may emit light with various colors according to the type of the information output from the electronic device.

According to various embodiments, in the electronic device 100, one indicator may be arranged in the second electronic device 300, and an illumination may be simultaneously emitted through the inner opening 302 of the second electronic device 300 and the outer opening 303 of the second cover 403. Accordingly, the electronic device 100 may smoothly transmit state information of the electronic device 100 to the user even in a state in which the first cover 402 is either opened or closed.

Figure 3:
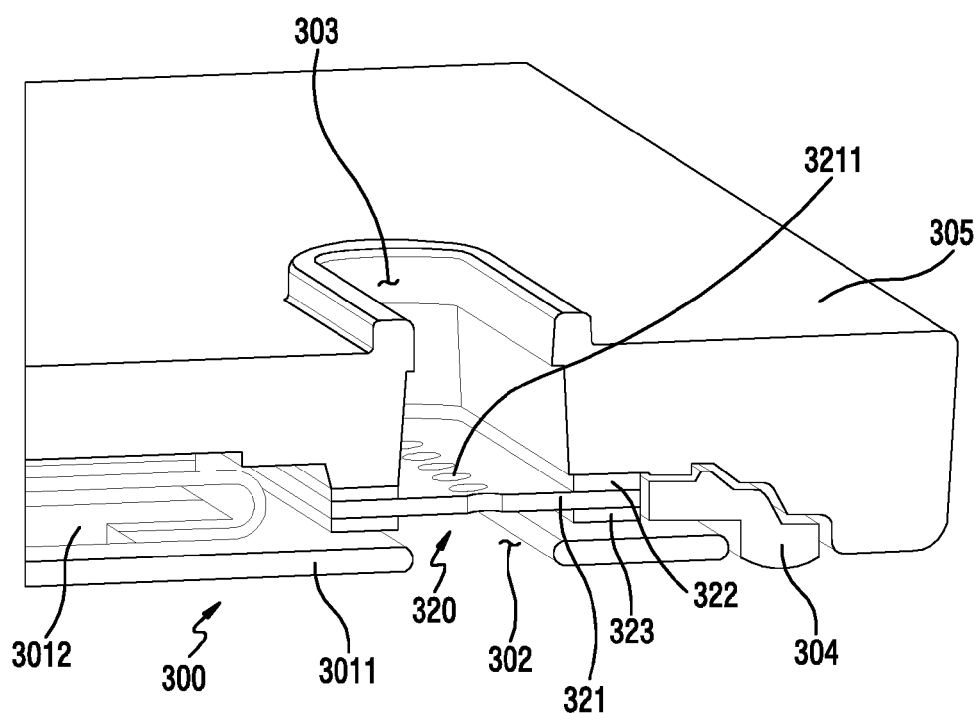
FIG. 3 illustrates a main part of a second electronic device including an indicator according to various embodiments of the present disclosure.

FIG. 3 is a partially cutaway perspective view illustrating a main part of a second electronic device 300 including an indicator 320 according to various embodiments of the present disclosure.

Referring to FIG. 3, in the second electronic device 300, a display module 3012 may be installed in a cover frame 305 forming the second cover. According to one embodiment, a window 3011 may be installed on the outer side of the display module 3012 by a support member 304. According to one embodiment, the display module 3012 may include a touch sensor for implementing a touch screen.

According to various embodiments, an outer opening 303 may be formed in the cover frame 305 and an inner opening 302 may be forming at a location of the window 3011 corresponding to the outer opening 303. According to one embodiment, an indicator 320 may be arranged in the interior of the electronic device 100 between the outer opening 303 and the inner opening 302. The indicator 320 may be configured such that light guide members 322 and 323 are laminated with an ornamental member 321 including a plurality of sound through-holes 3211 at the center thereof being interposed therebetween. According to one embodiment, the light guide members 322 and 323 may be arranged such that they do not intrude the inner opening 302 and the outer opening 303. According to one embodiment, the ornamental member 321 may be formed of a metal material. According to one embodiment, the ornamental member 321 may be formed of a light guiding material or a light reflecting material. According to one embodiment, the ornamental 321 may be formed of a synthetic material plated with chrome. According to one embodiment, the light guide members 322 and 323 may be formed of a glass or acryl material.

According to various embodiments, the indicator 320 may guide light irradiated from light guide elements 324 and 325 (see FIG. 4A), which will be described below, through the light guide members 322 and 323, and may emit an illumination to the inner openings 302 and 323 and the outer opening 303, which has been described, through the light guiding or light reflecting ornamental member 321.

Figure 4A:
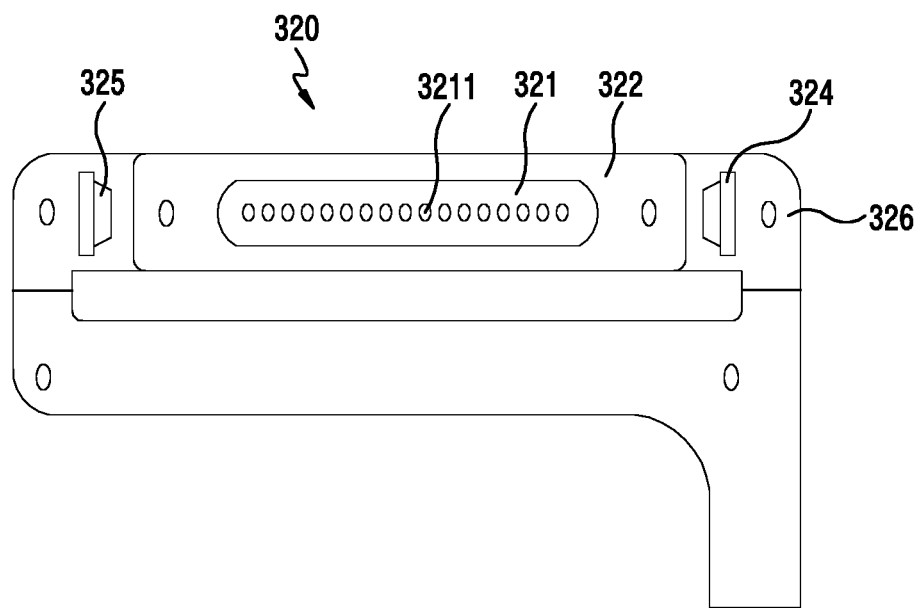
FIGS. 4A and 4B illustrate diagrams of an indicator according to various embodiments of the present disclosure.
Figure 4B:
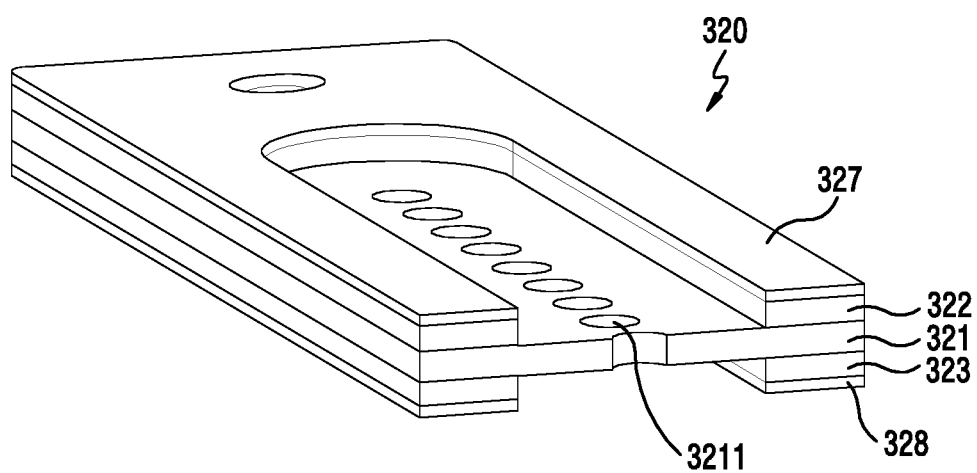

FIGS. 4A and 4B are diagrams of an indicator 320 according to various embodiments of the present disclosure.

Referring to FIGS. 4A and 4B, the indicator 320 may be arranged in a substrate 326 arranged in the second electronic device 300. According to one embodiment, the substrate 326 may be a flexible printed circuit (FPC). According to one embodiment, the flexible printed circuit may include light emitting elements 324 and 325 mounted at least one end of the light guide members 322 that is laminated with the ornamental member 321 being interposed therebetween. According to one embodiment, the light guide elements 324 and 325 may be mounted in a surface mounted device (SMD) form. According to one embodiment, the light guide elements 324 and 325 may be light guide diodes (LEDs). However, the present disclosure is not limited thereto, and the light emitting elements 324 and 325 may be light emitting sheets or light emitting films that may surface-emit light.

According to various embodiments, light guide members 322 and 323 may be laminated with the ornamental member 321 being interposed therebetween, and diffusion sheets (or diffusion films) 327 and 328 may be further laminated on the light guide members 322 and 323. According to one embodiment, the diffusion sheets 327 and 328 uniformly diffuse light guided by the light guide members 322 and 323, thereby contributing to inducing uniform emission of light through the inner opening 302 and the outer opening 303.

Figure 5A:
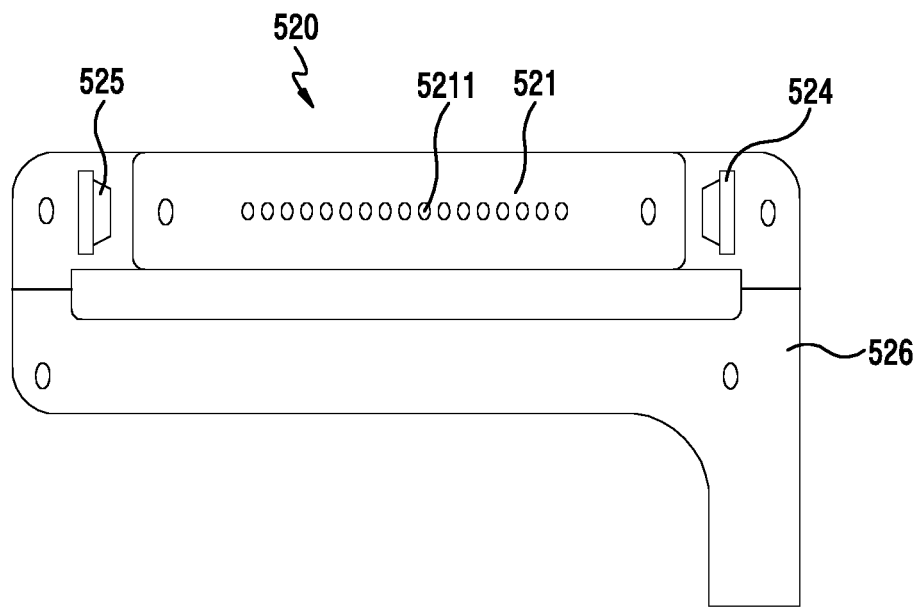
FIGS. 5A and 5B illustrate diagrams of an indicator according to various embodiments of the present disclosure.
Figure 5B:
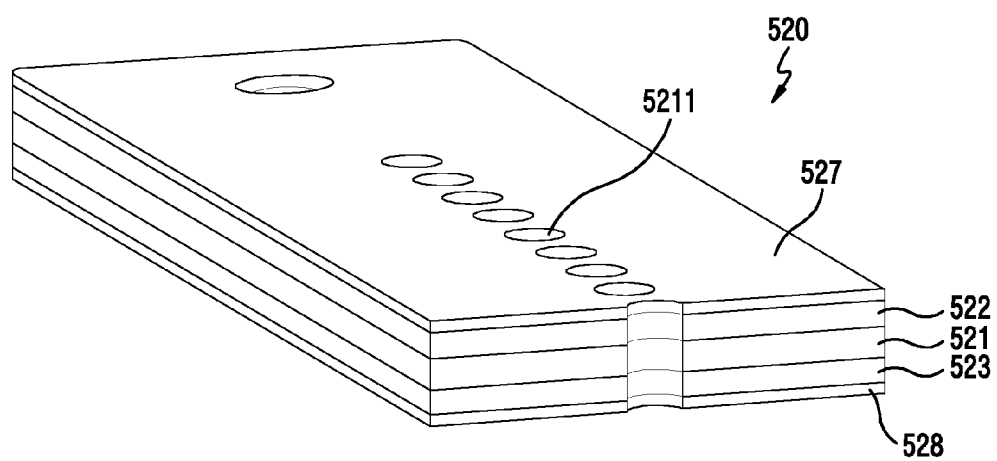

FIGS. 5A and 5B are diagrams of an indicator 520 according to various embodiments of the present disclosure.

Referring to FIGS. 5A and 5B, the indicator 520 may be arranged in a substrate 526 arranged in the second electronic device 300. According to one embodiment, the substrate 526 may be a flexible printed circuit (FPC). According to one embodiment, the flexible printed circuit may include light emitting elements 524 and 525 mounted at least one end of the light guide members 522 and 523 that is laminated with the diffusion sheet member 521 being interposed therebetween. According to one embodiment, the light guide elements 524 and 525 may be mounted on the substrate 526 in a surface mounted device (SMD) form. According to one embodiment, the light guide elements 524 and 525 may be light guide diodes (LEDs). However, the present disclosure is not limited thereto, and the light emitting elements 524 and 525 may be light emitting sheets or light emitting films that may surface-emit light.

According to various embodiments, light guide members 522 and 523 may be laminated with the diffusion sheet 521 being interposed therebetween, and light transmitting members 527 and 528 may be further laminated on the light guide members 522 and 523. According to one embodiment, the light transmitting members 527 and 528 may be formed of a translucent material. According to one embodiment, the light transmitting members 527 and 528 may be guided along the light guide members 522 and 523, and may be formed of a translucent material by which the light uniformly diffused by the diffusion sheet 521 may be transmitted to the outside. According to one embodiment, the light transmitting members 527 and 528 may be deposited or adhered films.

According to various embodiments, because the light guide members 522 and 523 are laminated with the diffusion sheet 521 being interposed therebetween and the translucent light transmitting members 527 and 528 are laminated on the outer sides of the light guide members 522 and 523 in the exemplary embodiment, a separate opening other than the sound through-hole 5211 is not required. Accordingly, the light provided by the light emitting element 524 may be provided as an illumination by guiding the light with the light guide members 522 and 523, uniformly diffusing the light by the diffusion sheet 521, and emitting the light through the inner opening 302 of the second electronic device 300 and the outer opening 303 of the second cover 403 through the light transmitting members 527 and 528.

Figure 6A:
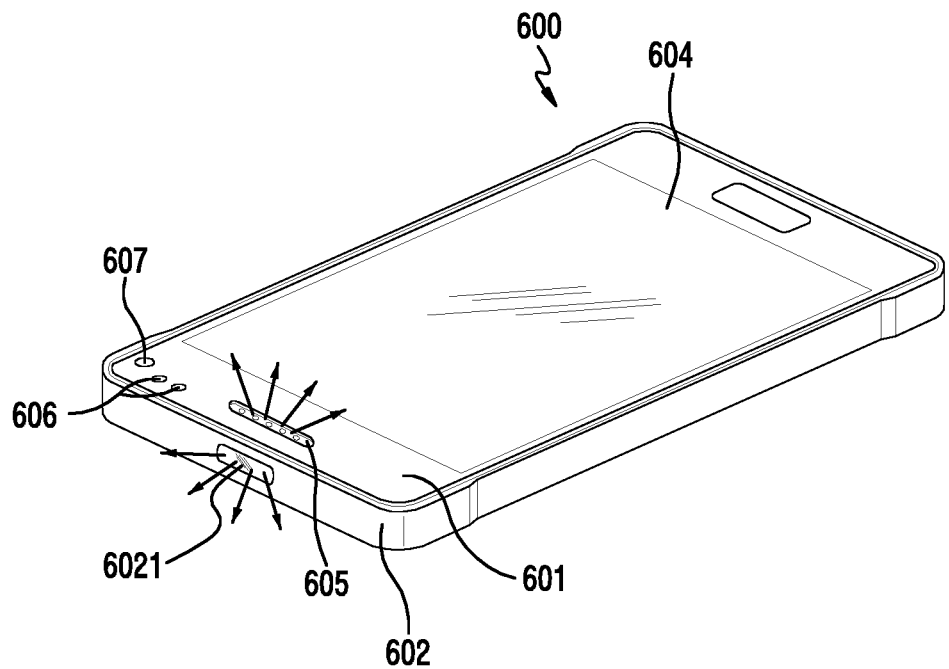
FIG. 6A illustrates a front surface of an electronic device including an indicator according to various embodiments of the present disclosure.
Figure 6B:
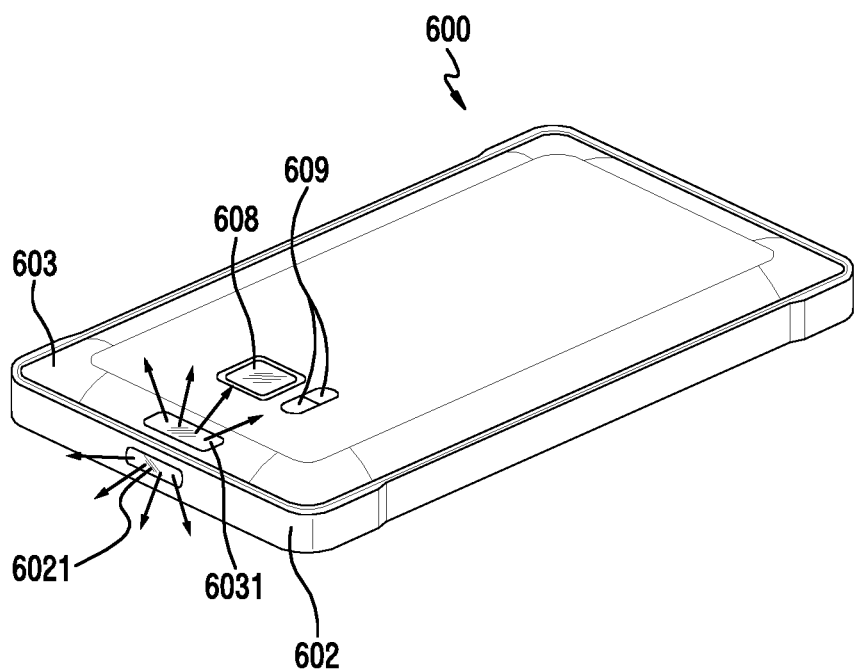
FIG. 6B illustrates a rear surface of an electronic device including an indicator according to various embodiments of the present disclosure.

FIG. 6A is a perspective view illustrating a front surface of an electronic device including an indicator according to various embodiments of the present disclosure. FIG. 6B is a perspective view illustrating a rear surface of an electronic device including an indicator according to various embodiments of the present disclosure.

FIGS. 6A and 6B illustrate a state in which an indicator that may simultaneously provide an illumination on various surfaces of one electronic device 600 is arranged.

As illustrated in FIG. 6A, according to various embodiments of the present disclosure, a display 604 may be arranged on a front surface 601. A speaker unit 605 may be arranged above the display 604. According to one embodiment, the electronic device 600 may be arranged around the speaker unit 605 and may include components for performing various functions of the electronic device 600. The components may include one or more sensor modules 606. The sensor module 606 may include at least one, for example, of an illumination intensity sensor (for example, a light sensor), a proximity sensor, an infrared ray sensor, and an ultrasonic wave sensor. According to one embodiment, the components may include a front camera unit 607.

According to various embodiments, the speaker unit 605 of the electronic device 600 may include an opening, and may be configured to emit an illumination as in the configuration of the above-described indicator. According to one embodiment, a side window 6021 may be arranged on a side surface 602 of the electronic device 600. According to one embodiment, the side window 6021 may be arranged around the speaker unit 605. According to one embodiment, the light of the indicator emitted to the speaker unit 605 may be emitted through the side window 6021 at the same time.

As illustrated in FIG. 6B, a rear camera unit 608 may be arranged on a rear surface 603 of the electronic device 600, and various electronic components 609 may be arranged around the rear camera unit 608. According to one embodiment, the electronic components 609 may be at least one of a flash unit, a heart rate sensor, an ultrasonic sensor, and a fingerprint recognition sensor. According to one embodiment, a rear window 6031 may also be provided on a rear surface 603 of the electronic device 600. According to one embodiment, the rear window 6031 may be arranged around the side window 6021. According to one embodiment, the light of the indicator emitted to the speaker unit 605 may be emitted through the rear window 6031 at the same time.

According to various embodiments, the electronic device 600 may include an indicator 630 (see FIG. 7), and the indicator 630 may emit an illumination through the speaker unit 605, the side window 6021, and the rear window 6031 at the same time. According to one embodiment, even though the electronic device 600 is positioned in any state by the indicator 630, the state information of the electronic device 600 may be transmitted to the user such that the user may instantaneously recognize the state information.

Figure 7:
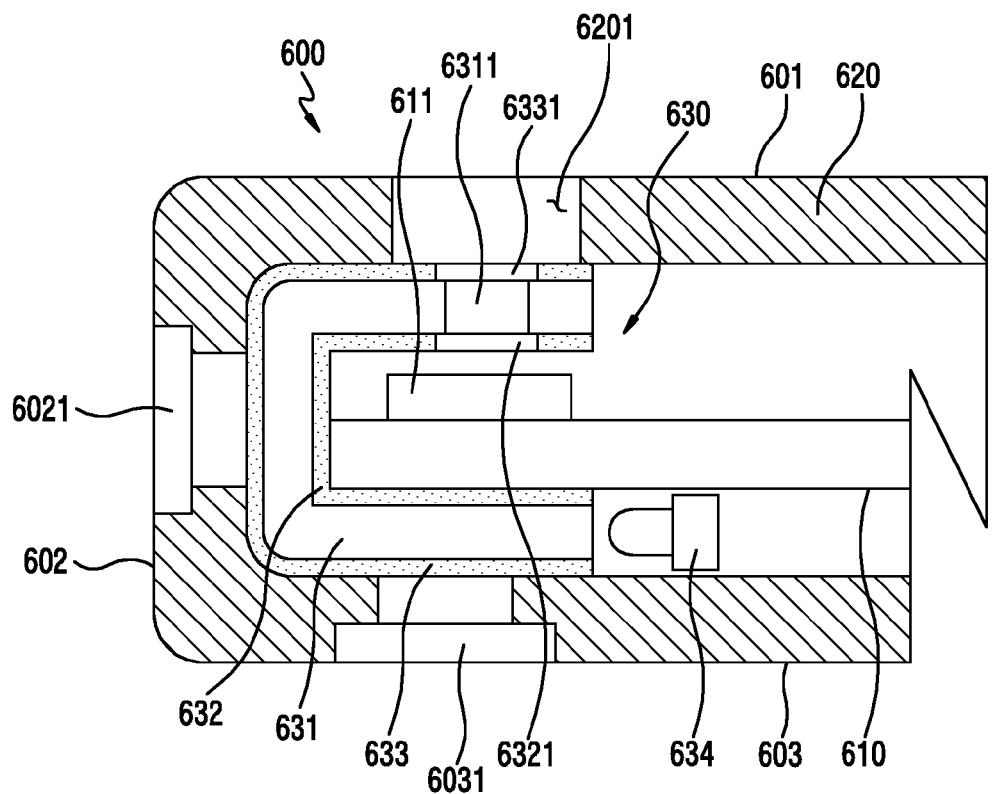
FIG. 7 illustrates a main part of an electronic device in which an indicator is installed according to various embodiments of the present disclosure.

FIG. 7 is a sectional view illustrating a main part of an electronic device 600 in which an indicator is installed according to various embodiments of the present disclosure.

Referring to FIG. 7, the electronic device 600 may include a housing 620 having an interior space therein. According to one embodiment, the housing 620 includes a front surface 601, a side surface 602 extending from the front surface 601 and having a predetermined height, and a rear surface 603 extending from the side surface 602. According to one embodiment, a substrate 610 may be arranged in the interior space of the housing 620. According to one embodiment, a speaker module 611 may be mounted on the substrate 610. However, the present disclosure is not limited thereto, but various electronic components that may communicate with the outside in at least one area of the housing 620 may be applied. According to one embodiment, the electronic components may include at least one of a microphone unit, an interface connector that may be connected to an external device, and a sensor module for sensing an external environment condition.

According to various embodiments, an indicator 630 may be provided in the interior of the electronic device 600. According to one embodiment, the indicator 630 may be arranged such that a pair of light guide members 632 and 633 are laminated with an ornamental member 631 being interposed therebetween. According to one embodiment, the light guide members 632 and 633 may be diffusion sheets. In this case, the indicator 630 may include a light guide member 632, and a light emitting element 634 mounted on the substrate 610 or arranged around the light guide members 632 and 633 or arranged around the light guide members 632 and 633. According to one embodiment, the light emitting element 634 may be an LED.

According to various embodiments, a sound guide hole 6311 may be formed at a location of the ornamental member 631 corresponding to the speaker module 611. According to one embodiment, openings 6321 and 6331 may be formed at corresponding locations of the light guide members 632 and 633. According to one embodiment, a speaker opening 6201 may be formed on the front surface 601 of the housing 620 corresponding to the sound guide hole 6311 of the ornamental member 631 corresponding to the speaker module 611 and the openings 6321 and 6331 of the light guide members 632 and 633. According to one embodiment, the light emitted from the light emitting element 634 is guided through the light guide members 632 and 633, and may be emitted as an illumination through the speaker opening 6201 after being uniformly diffused to the surroundings through the diffusion sheet.

According to various embodiments, at the same time, the side window 6021 may be arranged to the light guide member 633 on a side surface 602 of the housing 620, and the light guided to the light guide member 633 may be emitted to the outside of the electronic device 600 as an illumination through the side window 6021 after being diffused by the diffusion sheet.

According to various embodiments, at the same time, the rear window 6031 may be arranged to the light guide member 633 on a rear surface 603 of the housing 620, and the light guided to the light guide member 633 may be emitted to the outside of the electronic device 600 as an illumination through the rear window 6031 after being diffused by the diffusion sheet.

According to various embodiments, because the light irradiated through one indicator 630 is emitted as an illumination through at least two surfaces 601, 602, and 603 of the electronic device 600, the electronic device 600 may provide alarm information for the user such that the user may smoothly recognize the alarm information even in various arrangement states.

According to various embodiments, because the electronic device can improve convenience of use of the electronic device by allowing the user to easily recognize information output from the electronic device regardless of the positioning state of the electronic device because the indicator is arranged such that information may be output on at least two surfaces at the same time.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An indicator comprising:
one or more light guide members;
one or more light emitting elements arranged around the light guide members; and
diffusion sheets at least partially laminated on one or more surfaces of the light guide members and configured such that light irradiated from the light emitting elements is uniformly spread out to the light guide members after being guided to the light guide members,
wherein the light diffused by the diffusion sheets is simultaneously emitted on two or more different surfaces outside of an electronic device, and
wherein a pair of light guide members are arranged with an ornamental member interposed between the light guide members.

2. The indicator of claim 1, wherein the diffusion sheets are laminated on outer surfaces of the ornamental member.

3. The indicator of claim 1, wherein the light guide members and the diffusion sheets include openings through which the ornamental member is exposed.

4. The indicator of claim 1, wherein the ornamental member is formed of a light reflecting material, and the light diffused by the diffusion sheet is reflected by the ornamental member and is irradiated to the outside of the electronic device.

5. The indicator of claim 1, wherein the ornamental member is formed of a metal material or a synthetic resin and is plated with a metal material.

6. The indicator of claim 1, wherein the indicator is arranged in an openable one of electronic devices comprising a foldable dual display.

7. The indicator of claim 1, wherein the indicator is arranged in an electronic component exposed to the outside of the electronic device and the light is emitted through the electronic component.

8. The indicator of claim 7, wherein the electronic component is at least one of a speaker unit, a microphone unit, an interface connector, a flash unit, and a sensor module.

9. The indicator of claim 1, wherein the light emitting element is a light emitting sheet that surface-emits light by a light emitting diode (LED) or through application of electric power.

10. The indicator of claim 1, wherein the indicator emits light in a direction perpendicular to two or more surfaces of a front surface of the electronic device, a side surface adjacent to the front surface, and a rear surface adjacent to the side surface.

11. The indicator of claim 10, wherein an electronic component exposed to an outside of the electronic device is provided on at least one of the surfaces, and light is emitted through the electronic component.

12. The indicator of claim 11, wherein the electronic component is at least one of a speaker unit, a microphone unit, an interface connector, a flash unit, and a sensor module.

13. An indicator comprising:
one or more light guide members;
one or more light emitting elements arranged around the light guide members; and
diffusion sheets at least partially laminated on one or more surfaces of the light guide members and configured such that light irradiated from the light emitting elements is uniformly spread out to the light guide members after being guided to the light guide members,
wherein the light diffused by the diffusion sheets is simultaneously emitted on two or more different surfaces outside of an electronic device,
wherein a pair of light guide members are arranged with a diffusion sheet interposed between the light guide members, and
wherein light transmitting members are laminated on outer surfaces of the light guide members.

14. The indicator of claim 13, wherein the light transmitting members are formed of an adhered film, or a translucent material formed through deposition.

15. An electronic device comprising:
a housing; and
an indicator formed in the housing, the indicator comprising:
one or more light guide members;
one or more light emitting elements arranged around the light guide members; and
diffusion sheets at least partially laminated on one or more surfaces of the light guide members and configured such that light irradiated from the light emitting elements is uniformly spread out to the light guide members after being guided to the light guide members,
wherein the light diffused by the diffusion sheets is simultaneously emitted on two or more different surfaces outside of an electronic device, and
wherein a pair of light guide members are arranged with an ornamental member interposed between the light guide members.

* * * * *